(12) United States Patent
Homan et al.

(10) Patent No.: US 8,162,401 B2
(45) Date of Patent: Apr. 24, 2012

(54) BRACKET SYSTEM ADAPTED FOR USE IN A RAISING AND LOWERING MECHANISM OF AN ADJUSTABLE HEADREST OF A VEHICLE SEAT

(75) Inventors: Arnout Homan, Frillesas (SE);
Nicholas Morrell, East Yorkshire (GB);
Anders Kvarnstrom, Taberg (SE)

(73) Assignees: Kongberg Automotive AB, Mullsjo (SE); Johnson Controls GmbH, Burscheid (DE)

( * ) Notice: Subject to any disclaimer, the term of this patent is extended or adjusted under 35 U.S.C. 154(b) by 313 days.

(21) Appl. No.: 12/299,720

(22) PCT Filed: May 7, 2007

(86) PCT No.: PCT/EP2007/004014
§ 371 (c)(1),
(2), (4) Date: Jul. 10, 2009

(87) PCT Pub. No.: WO2007/128548
PCT Pub. Date: Nov. 15, 2007

(65) Prior Publication Data
US 2010/0171354 A1    Jul. 8, 2010

(30) Foreign Application Priority Data

May 5, 2006   (SE) ......................................... 0601018
Oct. 27, 2006  (DE) .......................... 10 2006 051 536

(51) Int. Cl.
*B60N 2/48*    (2006.01)

(52) U.S. Cl. ...................................................... 297/410
(58) Field of Classification Search ................... 297/410, 297/411.36
See application file for complete search history.

(56) References Cited

U.S. PATENT DOCUMENTS

| 4,527,834 | A |   | 7/1985 | Zyngier |
| 5,080,437 | A |   | 1/1992 | Pesta et al. |
| 5,713,635 | A | * | 2/1998 | De Filippo ..................... 297/410 |
| 5,860,703 | A | * | 1/1999 | Courtois et al. .............. 297/410 |
| 5,934,755 | A | * | 8/1999 | Halamish ...................... 297/410 |
| 6,655,742 | B1 |   | 12/2003 | Ozaki |
| 6,874,854 | B2 | * | 4/2005 | Terrand et al. ................ 297/410 |
| 7,159,946 | B2 | * | 1/2007 | Gurtatowski et al. ......... 297/410 |
| 7,172,255 | B2 | * | 2/2007 | Wanke .......................... 297/410 |
| 2005/0212343 | A1 | * | 9/2005 | Katahira ....................... 297/410 |
| 2006/0214492 | A1 | * | 9/2006 | Hassler et al. ................ 297/410 |

FOREIGN PATENT DOCUMENTS

| EP | 1 046 541 | 10/2000 |
| EP | 1 354 756 | 10/2003 |
| EP | 1 541 409 | 6/2005 |

* cited by examiner

*Primary Examiner* — Peter R. Brown
(74) *Attorney, Agent, or Firm* — Steven M. Jensen; Edwards Wildman Palmer LLP

(57) ABSTRACT

The present invention relates to a bracket system (1) adapted for use in a raising and lowering mechanism of an adjustable headrest (4) of a vehicle seat. The inventive bracket system (1) adapted for use in a raising and lowering mechanism of an adjustable headrest (4) of a vehicle seat comprises a spring element (8) an actuation arm (7) a longitudinal carrier bar (2) carrying the head rest (4) and having on its surface at least one notch of a first kind (9) and at least one notch of a second kind (10).

20 Claims, 10 Drawing Sheets

BRACKET SYSTEM ADAPTED FOR USE IN A RAISING AND LOWERING MECHANISM OF AN ADJUSTABLE HEADREST OF A VEHICLE SEAT

The present invention relates to a bracket system adapted for use in a raising and lowering mechanism of an adjustable headrest of a vehicle seat.

Adjustable headrests belong to the standard equipment of vehicle seats. Due to safety requirements from various bodies, it is desirable for the headrest not be able to be inadvertently lowered in an accident. That means that a raisable and lowerable headrest must be provided with a secure locking device, at least for the lowering movement. As the headrest itself represents an important part of the safety equipment in a vehicle it should not be able for the ordinary user to dismount it easily. On the other hand, practical considerations of processes such as assembly, dismounting or maintenance of vehicle seats suggest to a enable an expert to dismount the headrest of a vehicle seat in an easy and handy way.

EP 1046541 describes an adjusting mechanism for a vehicle's seat headrest. The document discloses a locking mechanism for the lowering movement as well as for the raising movement, i.e. the dismounting, of the headrest, but suffers from a security hole as the same release action for both locking directions is used. By that, an ordinary user can not only adjust the height of the headrest, but she/he can also easily dismount the same.

The locking mechanism disclosed in EP 1046541 as well as those described in US 2003/0222493, EP 1354 756, FR 2877616 and U.S. Pat. No. 4,527,834 teach relatively small locking devices that are directly attached near one of two reception holes in the top of the backrest for accommodating two carrier bars commonly used in the support rack of a headrest. It is not sensible to arrange these locking devices at both carrier bars as a raising and lowering action in parallel to a release action of both locking devices would almost be infeasible for two hands. The result of this is an asymmetric seat design that limits the aesthetics. Furthermore, it is nearly impossible to raise or lower the headrest for a user who is seated on the concerning vehicle seat.

It is the object of the present invention to provide a locking mechanism for a vehicle's seat headrest that makes sure that the lowering movement is securely locked in case of an accident and that the headrest can not easily be dismounted by an ordinary user. On the other hand, it should be possible for an expert to dismount the headrest easily. Furthermore, a locking mechanism providing for an easy and handy release action and allowing for a symmetric outer design that enables a one-hand operation is desirable.

The present invention achieves the above-mentioned object by providing a bracket system according to the characteristic features of independent claim 1. Preferred embodiments of the invention are covered by the dependent claims 2 to 15.

According to the invention, the bracket system adapted for use in a raising and lowering mechanism of an adjustable headrest of a vehicle seat, comprises a spring element with a first and a second portion, an actuation arm that can be actuated in a first and a second direction, a longitudinal carrier bar carrying the head rest and having on the surface at least one notch of a first kind and at least one notch of a second kind, said at least one notch of a first kind and the second kind being located on a first and a second line, respectively, said lines being parallel to the longitudinal axis of the carrier bar and separated from each other, said carrier bar being slidably mounted in a carrier bar guiding, wherein the first portion of the spring element is biased towards the first line, such that the first portion of the spring element is able to engage a notch of a first kind in said carrier bar in order to lock a longitudinal movement of the carrier bar in one direction, and the second portion of the spring element is biased towards the second line, such that the second portion of the spring element is able to engage a notch of a second kind in said carrier bar in order to lock a longitudinal movement of the carrier bar in the other direction, with the characterising feature that the actuation arm is arranged in contact with the first and/or the second portion of the spring element, such that upon actuation in said first direction the first portion of the spring element is moved away from the carrier bar, such that the first portion of the spring element is not able to engage a notch of a first kind in said carrier bar in order to allow a longitudinal movement of the carrier bar in said one direction, and upon actuation in said second direction the second portion of the spring element is moved away from the carrier bar, such that the second portion of the spring element is not able to engage a notch of a second kind in said carrier bar in order to allow a longitudinal movement of the carrier bar in said other direction.

The notches are asymmetrically formed such that a longitudinal movement of the carrier bar can be locked by the notches of the first kind only in said one direction and by the notches of the second kind only in said other direction. Therefore, the headrest can be moved in said other direction when the first portion of the spring element engages a notch of a first kind as long as the second portion of the spring element does not engage a notch of a second kind. Vice versa, the headrest can be moved in said one direction when the second portion of the spring element engages a notch of a second kind as long as the first portion of the spring element does not engage a notch of a first kind. The headrest is free to slide longitudinally when the spring element neither engages a notch of the first kind nor a notch of a second kind.

In a typical arrangement the headrest comprises several notches of a first kind and only one notch of a second kind wherein the notches of a first kind prevent the headrest from lowering and the notch of a second kind prevents the headrest from being dismounted by pulling it out. In such a configuration, said one direction that can be locked by the notches of the first kind is the downward direction and said other direction that can be locked by the notch of the second kind is the upward direction. As upon engagement of the notch of the second kind the point of maximum extraction is reached, the notches of the first kind are preferably located further upwards with respect to the notch of the second kind. The lower-most notch of the first kind may in such a configuration be positioned such that the first portion of the spring element is able to engage the lowermost notch of the first kind when the second portion of the spring element is able to engage the notch of a second kind.

In a preferred embodiment of the invention, the actuation of the actuation arm in said second direction is blocked for the ordinary user by means of an attached component that can be dismounted. Preferably, the actuation arm is in contact with a button that can be pressed by the user, such that a pushing of the button corresponds to an actuation of the actuation arm in said first direction. In such an embodiment, the attached component blocking the actuation in said second direction can be the mounting frame of that button, such that an actuation of the actuation arm in said second direction corresponds to a tearing of the actuation arm which is only possible when the button and the mounting thereof are dismounted.

In an alternative embodiment of the invention, the actuation of the actuation arm in said second direction is hampered by ribs located adjacent to the actuation lever in engagement with the actuation lever such that a force is needed to overcome this engagement when moving the actuation lever into the second direction to disengage the notches of the second kind.

The spring element, the actuation arm and the carrier bar guidance of the bracket system can be arranged in the backrest or in the headrest of a vehicle seat. In the first case, the carrier bar is preferably fixed to the headrest of the vehicle seat and is longitudinally slidable with respect to the fixed carrier bar guidance in the backrest of the vehicle seat. In the latter case, the carrier bar is fixed to the backrest of a vehicle seat and the carrier bar guidance is longitudinally slidable with respect to the carrier bar fixed to the backrest of said vehicle seat. In an embodiment wherein the actuation arm is in contact with a button that can be pressed by the user button, the button protrudes the upholstery of the vehicle's seat backrest or headrest, respectively, such that it can be pressed by the user.

It is preferable that the actuation arm is pivotably connected to the carrier bar guidance and that a pivotal movement of the actuation arm into one and the other direction corresponds to the actuation of the actuation arm in the first and second direction, respectively.

In a preferred embodiment of the invention the actuation arm is spring loaded and urged to actuate in the second direction by means of a preloaded spring. Preferably, this spring load is large enough to actuate the actuation arm, such that the second portion of the spring element is moved away from the carrier bar, such that the second portion of the spring element is not able to engage a notch of a second kind in the carrier bar in order to allow a longitudinal movement of the carrier bar in the other direction, when the attached component is dismounted and the actuation of the actuation arm in the second direction is not blocked.

In order to allow a one-hand operation for the lowering operation the button in contact the actuation arm is preferably arranged on the vertical symmetry plane of the vehicle seat.

For convenience, the invention is now described on the basis of a preferred embodiment illustrated in the FIGS. 1 to 5. Nevertheless, the scope of the invention is not limited to the depicted embodiment.

Figure 1:
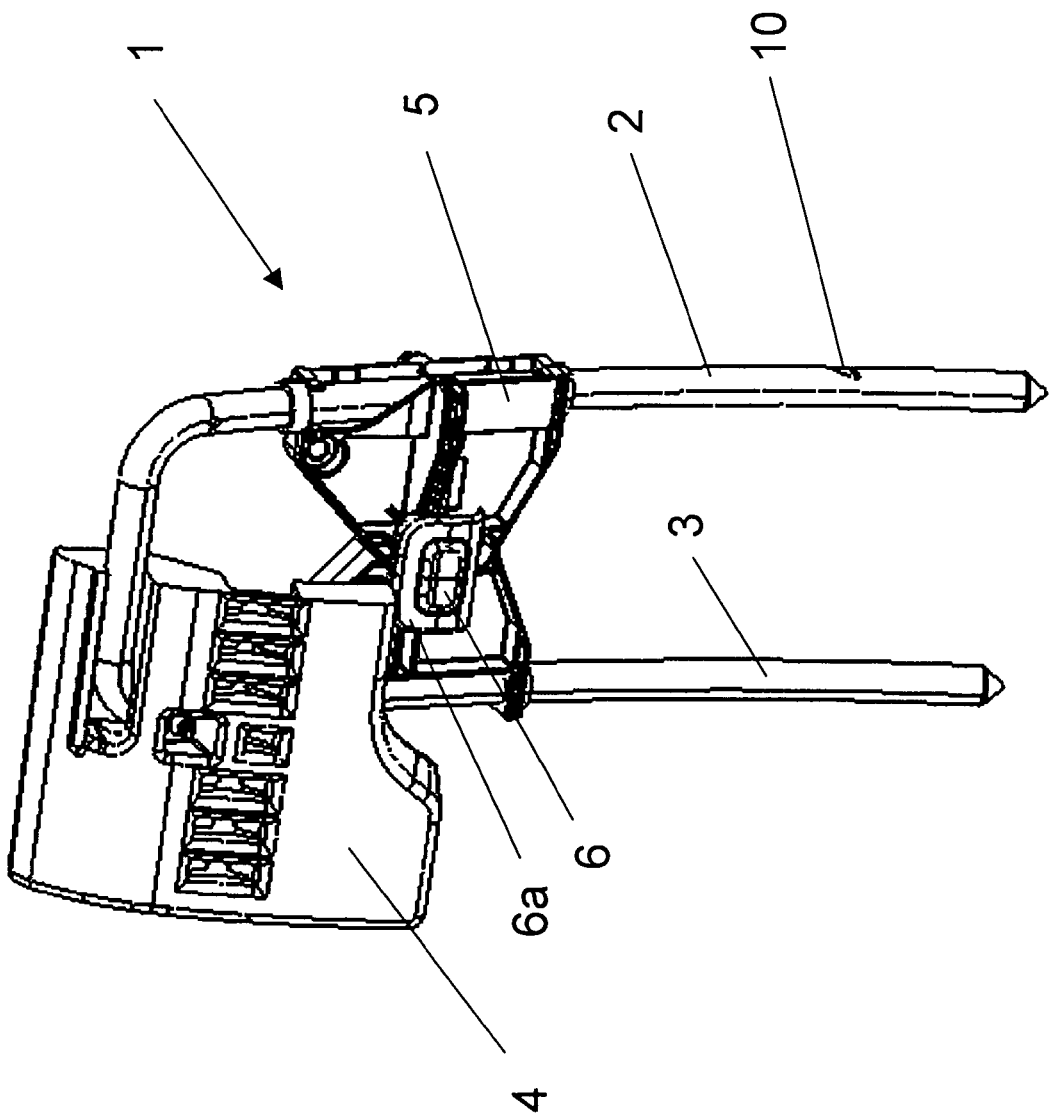
FIG. 1 shows a perspective phantom view of a preferred embodiment of the bracket system of a vehicle seat's headrest.
Figure 2:
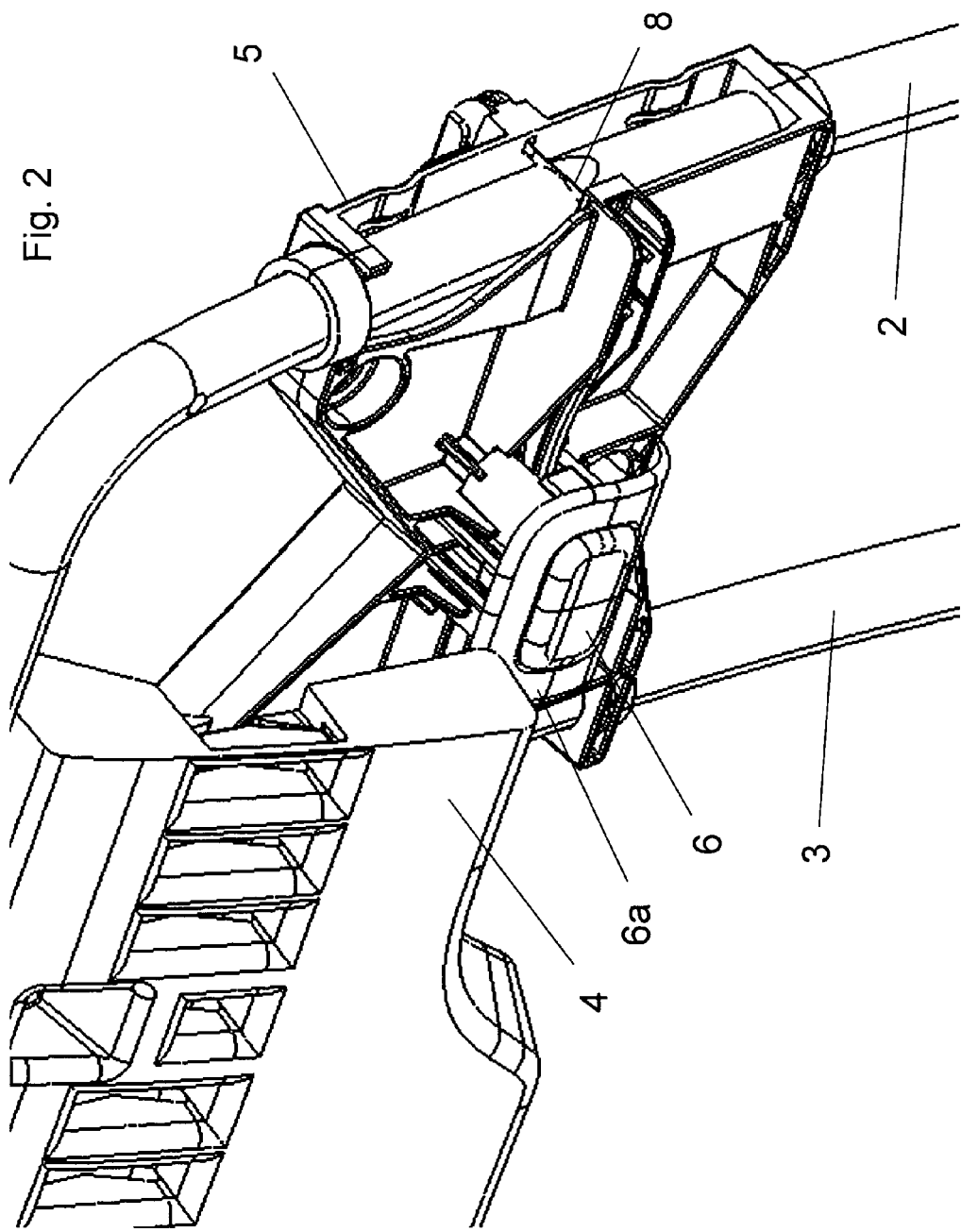
FIG. 2 shows a more detailed perspective phantom view of a preferred embodiment of the bracket system of a vehicle seat's headrest.
Figure 3:
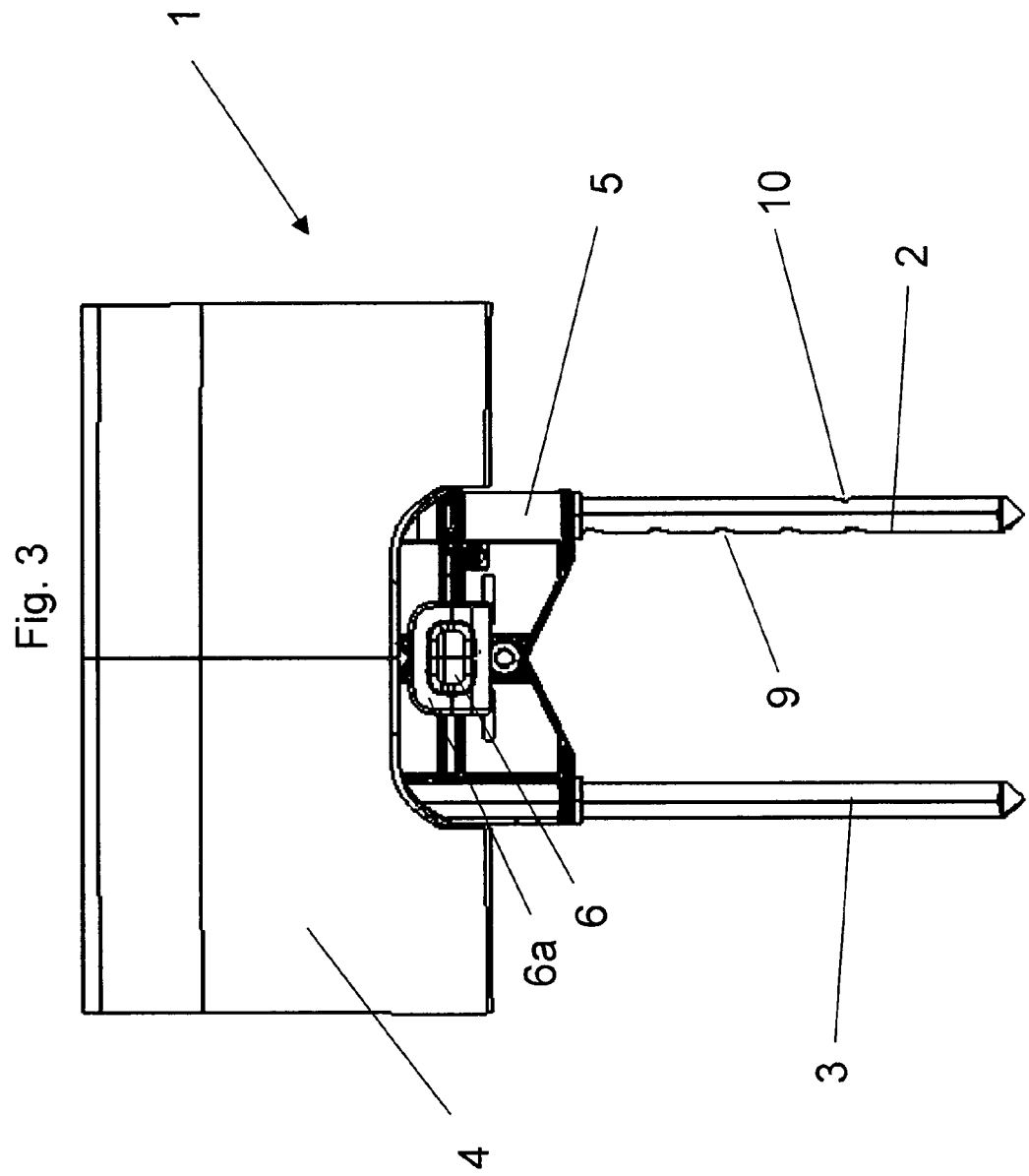
FIG. 3 shows a front phantom view of a preferred embodiment of the bracket system of a vehicle seat's headrest.
Figure 4:
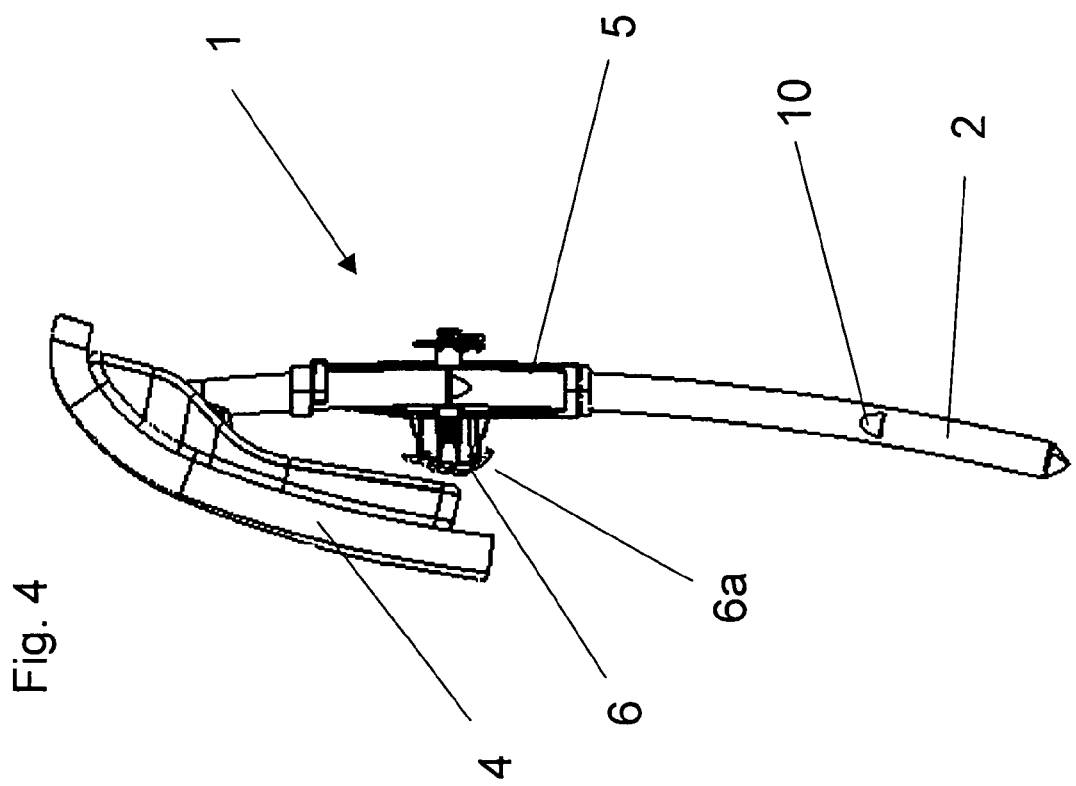
FIG. 4 shows a side phantom view of a preferred embodiment of the bracket system of a vehicle seat's headrest.

The preferred embodiment of the bracket 1 shown in FIGS. 1 to 4 comprises a first 2 and a second 3 carrier bar, preferably connected inside the head rest 4 in a U-shape, and a carrier bar guiding 5. The carrier bar guiding 5 is preferably connected to both carrier bars 2, 3 such that these can slide in an upwards and downwards movement relative to the carrier bar guiding 5 that is fixed in the vehicle seat's back rest (not shown).

In an alternative embodiment, that is not shown but can easily be deduced from the figures, the carrier bar guiding are fixed in the headrest while the carrier bars are fixed in the back rest, protruding the back rest's upholstery not closing in their protruding portions in contrast to the embodiment of FIGS. 1 to 4. The carrier bar guiding moves together with the head rest upwards and downwards relative to the carrier bars that are fixed in the vehicle seat's back rest. The configuration of notches of the first and second kind are interchanged accordingly.

Instead of two or more carrier bars the bracket system can also comprise only one carrier bar preferably comprising guided longitudinal edges to prevent a rotation of the head rest about the bar's longitudinal axis. A rectangular, flat or any other cross-sectional shape of the carrier bar may be possible and desirable.

Figure 5:
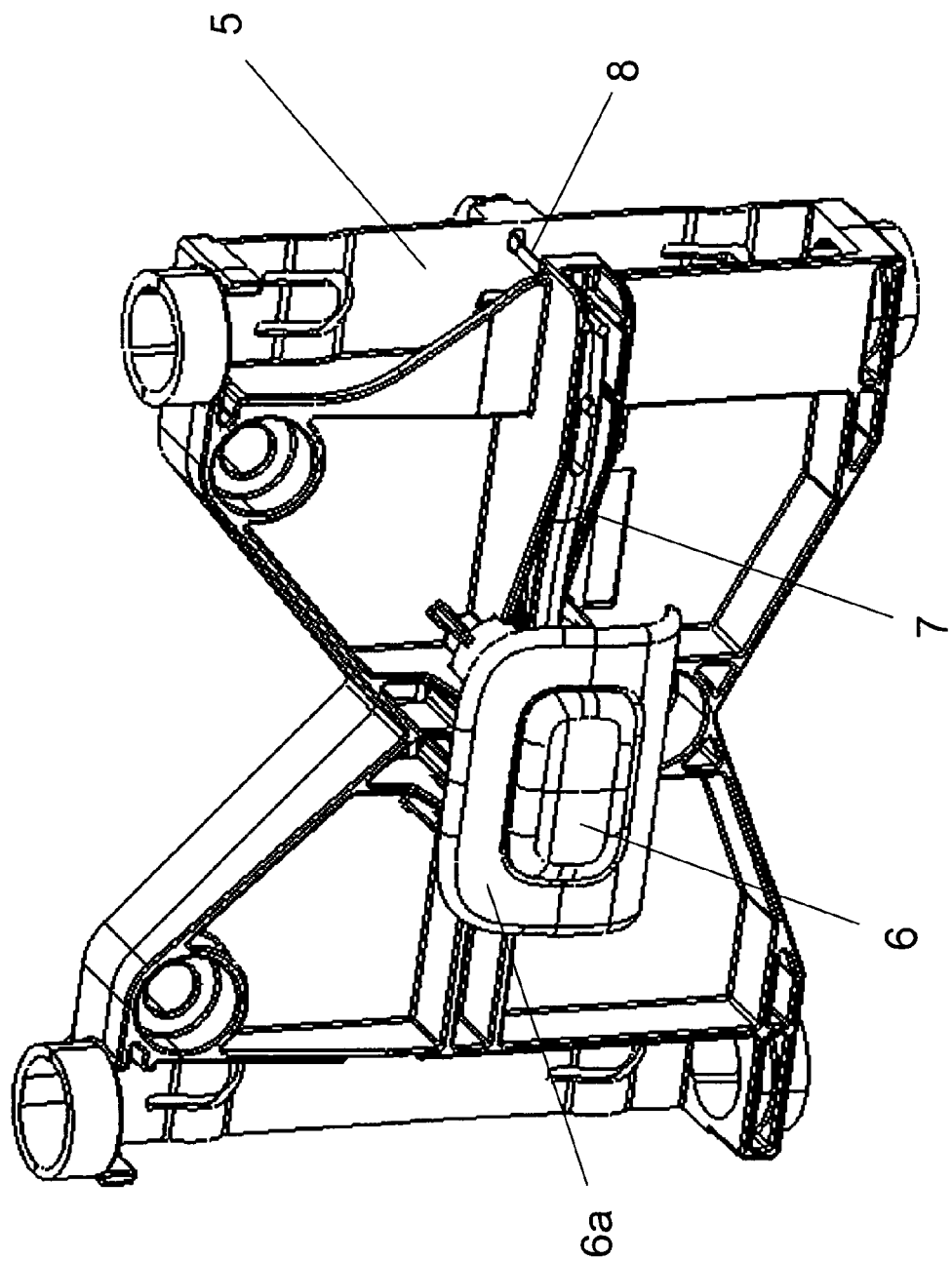
FIG. 5 shows a perspective view of a preferred embodiment of the bracket system without a carrier bar.

FIG. 5 shows a perspective view of a preferred embodiment of the bracket system without a carrier bar. The shown preferred carrier bar guiding 5 is substantially symmetrical with respect to the central vertical symmetry axis of the head rest. In the following the terms "inner"/"inwards" and "outer"/"outwards" refer to positions nearer and further, respectively, form the central vertical symmetry axis of the head rest.

The symmetry is disturbed by the mechanical means for locking a longitudinal movement of one carrier bar. These mechanical means comprise a spring element 8 and an actuation arm 7 that is pivotably attached to the carrier bar guiding 5 such that it can pivot about a vertical axis A (see FIG. 8). In this embodiment, a pivot movement of the actuation arm 7 about the axis A in the clockwise direction (seen from above) represents a first actuation direction and a pivot movement in the counter-clockwise direction (seen from above) represents a second actuation direction. The second actuation direction is blocked as long as the button 6 that can be pressed to actuate the actuation arm 7 in the first direction is mounted on the carrier bar guiding 5 with a mounting frame 6a as shown in FIG. 1 FIGS. 1 to 6. Employing a special tool the button 6 can be dismounted to allow an actuation in the second direction.

One portion of the actuation arm 7 is in contact with a button 6 that can be pressed inside a mounting frame 6a of the button 6. Another portion of the actuation arm 7 is in contact with the spring element 8 that is attached to the carrier bar guiding 5 such that two portions of the spring element bear laterally against the carrier bar from two opposite sides. Preferably, the spring element 8 has a W-shape or a U-shape and is arranged in a horizontal plane pointing with the first and second portion into the forward direction. In such an embodiment the actuation arm 7 in contact with the spring element 8 by a portion 72 comprises an opening 74 through which the first portion 81 of the spring element 8, preferably the inner one, protrudes. The opening 74 in the actuation arm 7, as it is shown in the embodiment of FIG. 5, has the form of a horizontal (across-vehicle) slit, such that the shift lever 8 can actuate in the second direction without forcing the first portion of the spring element 8 outwards. From the views in FIGS. 8 to 10 it becomes clear that the actuation arm 7 takes the form of an h-shaped bell crank in this embodiment such that a pushing of the button in an alongside-vehicle direction is transferred in an essentially across-vehicle movement of the portion 72 in contact with the spring element 8.

When the actuation arm 7 is not actuated in the second direction, the outer portion 73 of the opening 74 in the actuation arm 7 is located in contact with the first portion 81 of the spring element 8. Upon actuation in the second direction, the opening 74 allows the outer portion 72 of the actuation arm 7 in contact with the spring element 8 to move essentially in an outward direction. When the actuation arm 7 is not actuated in the second direction, the outer surface 71 of the outer portion 72 of the actuation arm 7 is located in loose contact with the second portion 82 of the spring element 8. Upon actuation in the second direction, the outer surface 71 of the outer portion 72 of the actuation arm 7 brushes outwards the second portion 81 of the spring element 8.

Figure 6:
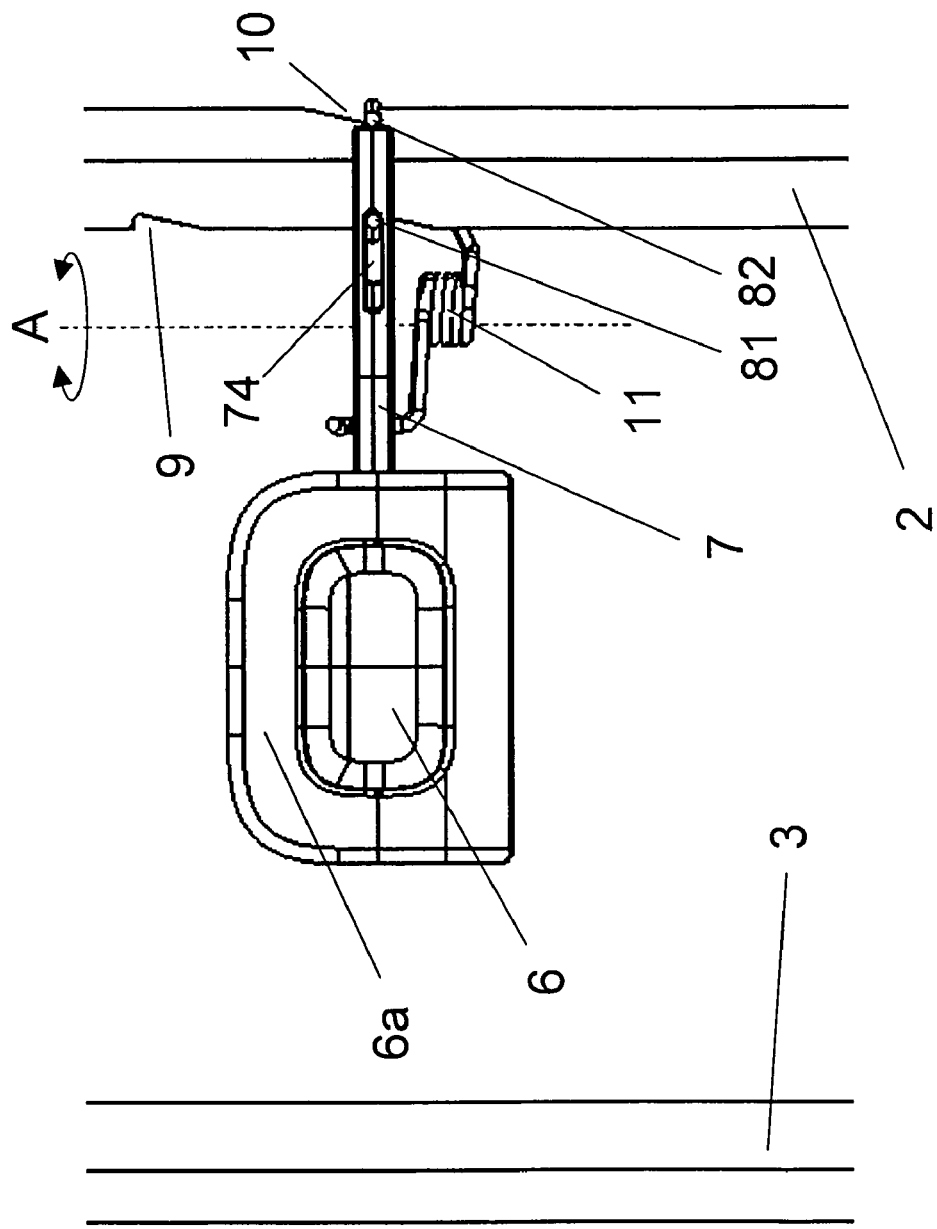
FIG. 6 shows a detail front phantom view of a preferred embodiment of the bracket system of a vehicle seat's headrest without carrier bar guiding.
Figure 7:
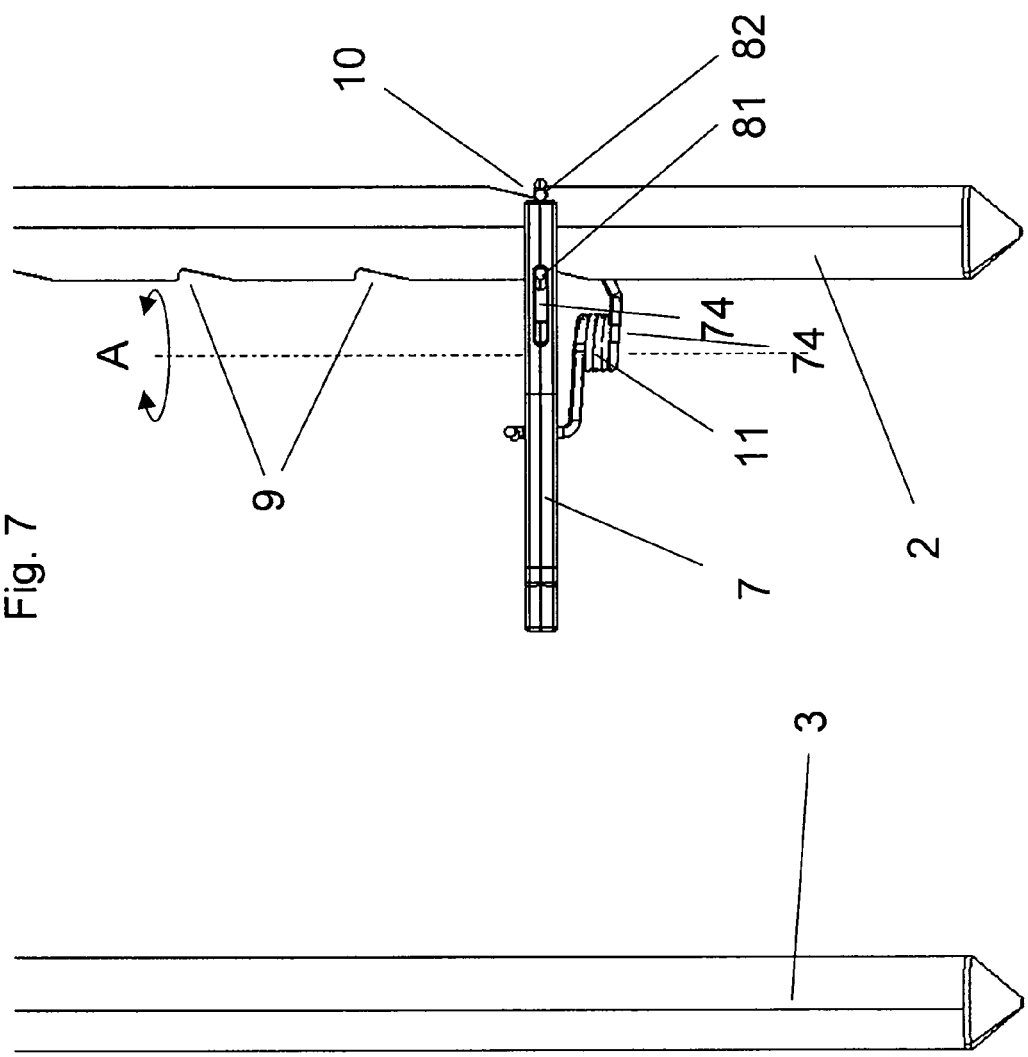
FIG. 7 shows a detail front phantom view of a preferred embodiment of the bracket system of a vehicle seat's headrest without carrier bar guiding and attached component.
Figure 8:
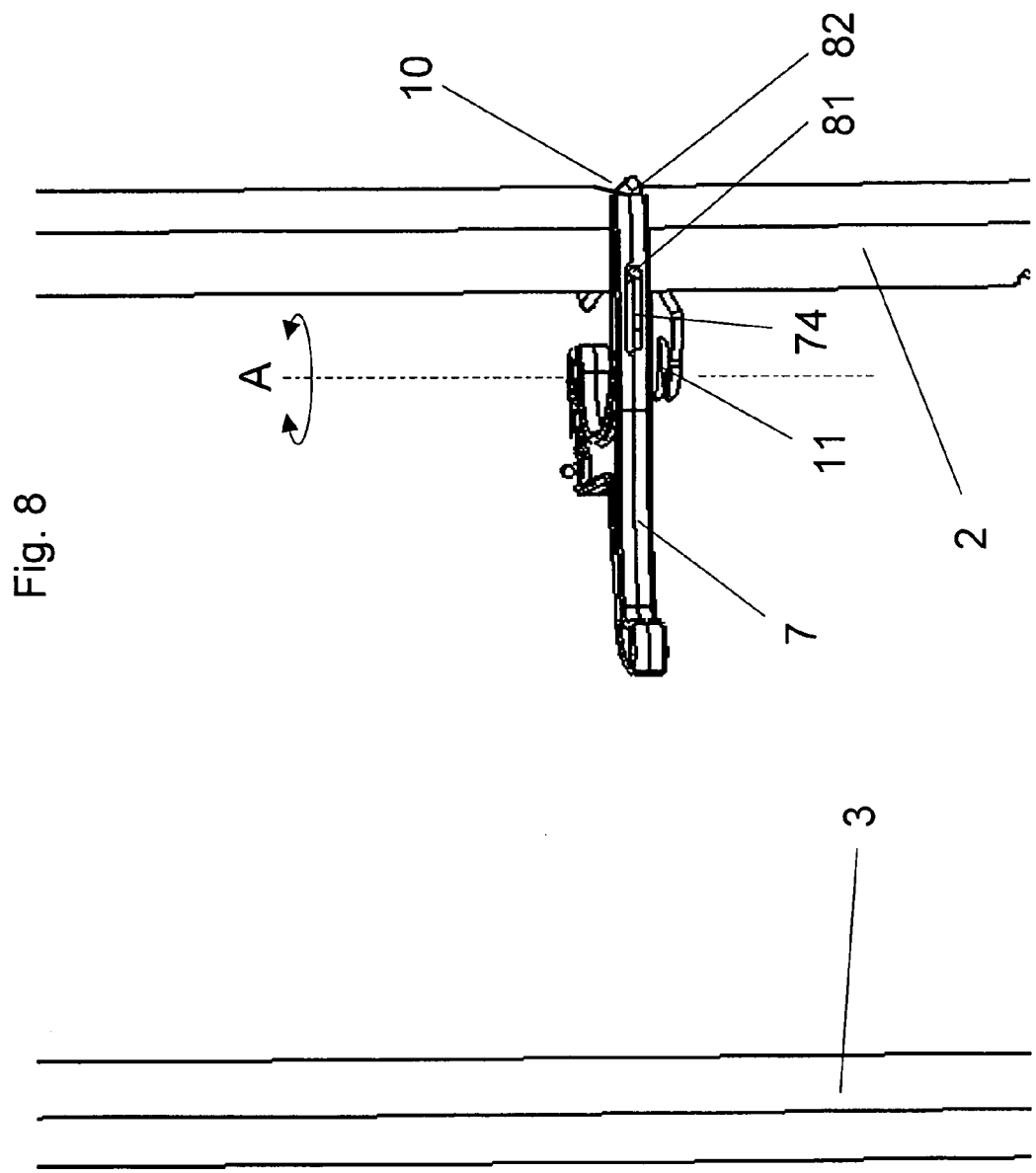
FIG. 8 shows a detail perspective phantom view of a preferred embodiment of the bracket system of a vehicle seat's headrest without carrier bar guiding and attached component.

FIGS. 6 to 8 show the mechanical means for blocking the carrier bar 2 with and without the button 6 mounted by means of a mounting frame 6a. Preferably, a preloaded spring 11 forces the actuation arm 7 in the second direction, i.e. the button back to the position where is was before it was pressed. By this arrangement, the button 6 and the actuation arm 7 automatically return into a normal position bearing against the mounting frame 6a in the second direction. As soon as the button 6 is dismounted employing a special tool, the spring 11 forces the actuation arm 7 to actuate in the second direction.

The carrier bar 2 comprises at least one notch of a first kind 9 at a first long side and at least one notch of a second kind 10 at a second long side that is opposite to the first long side. In this embodiment, there are several notches of a first kind 9 placed lined up along the inner side of the carrier bar 2. The notches of the first kind 9 comprise one inclined face pointing essentially downwards and one essentially horizontal top face. The notches are suited to engage a portion 81 of the spring element 8. Upon a downward movement of the carrier bar the inner portion 81 of the spring element 8 bearing against the inner side of the carrier bar 2 can slide along the inner side of the carrier bar 2 until it follows the inclined face of the nearest above notch of a first kind 9 to lock in place preventing the head rest from further lowering by the engagement of the notch of a first kind 9 as it is shown in FIGS. 6 to 8.

FIGS. 6 to 8 show the uppermost operation position of the head rest. This is because on the outer side of the carrier bar 2 there is a notch of a second kind 10 engaging the outer portion 82 of the spring element 8. In contrast to the notches of the first kind 9 the notch of the second kind 10 comprises an inclined face pointing essentially upwards and one essentially horizontal bottom face. Upon an upward movement of the carrier bar the outer portion 82 of the spring element 8 bearing against the outer side of the carrier bar can slide along the outer side of the carrier bar until it follows the inclined face of the notch of a second kind 10 to lock in place preventing the head rest from further raising by the engagement of the notch of a second kind 10 as it is shown in FIGS. 6 to 8.

It should be understood that in this embodiment the first and second portions 81, 81 of the spring element 8 have some play to move in a horizontal direction, but they are secured in a vertical direction preferably on both the front and rear side by portions of the carrier bar guiding 5 and/or the actuation arm 7 (see FIG. 5).

Figure 9:
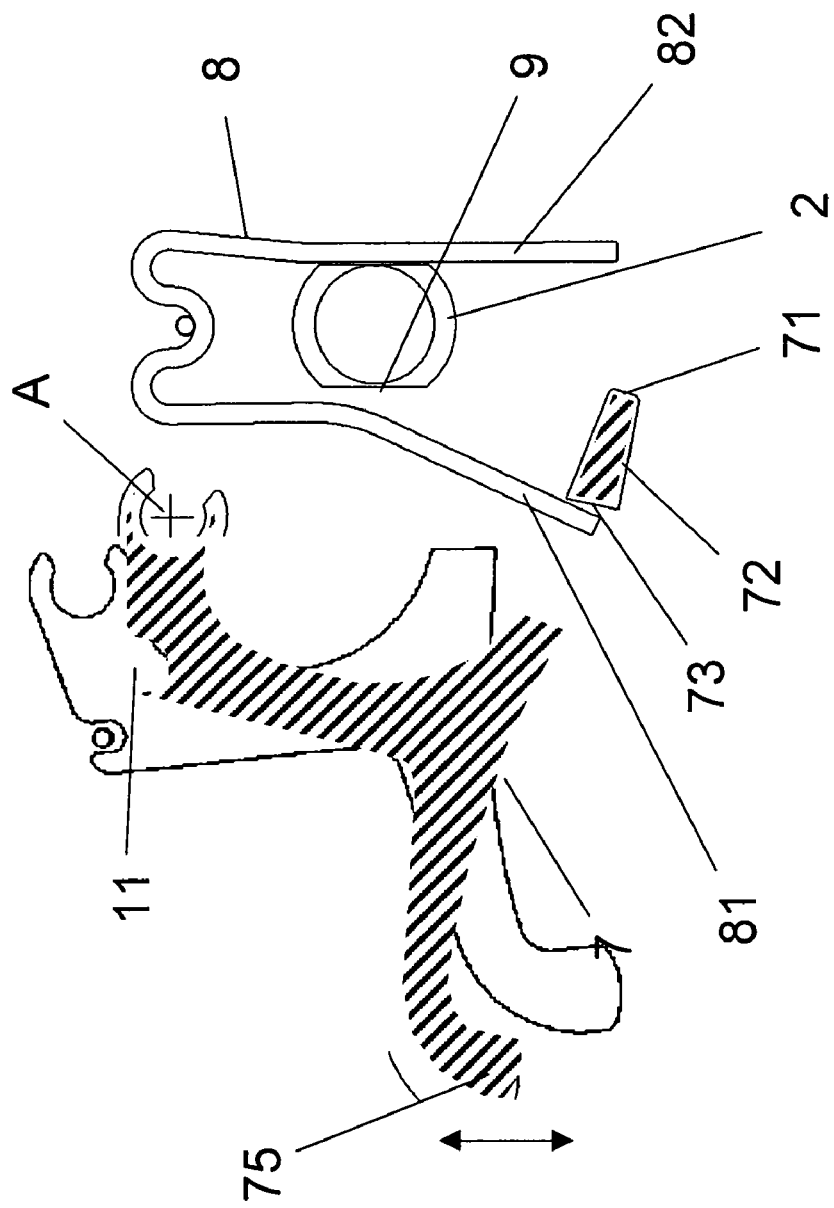
FIG. 9 shows a detailed cross-sectional top view of a preferred embodiment of the bracket system of a vehicle seat's headrest actuated in the first direction.
Figure 10:
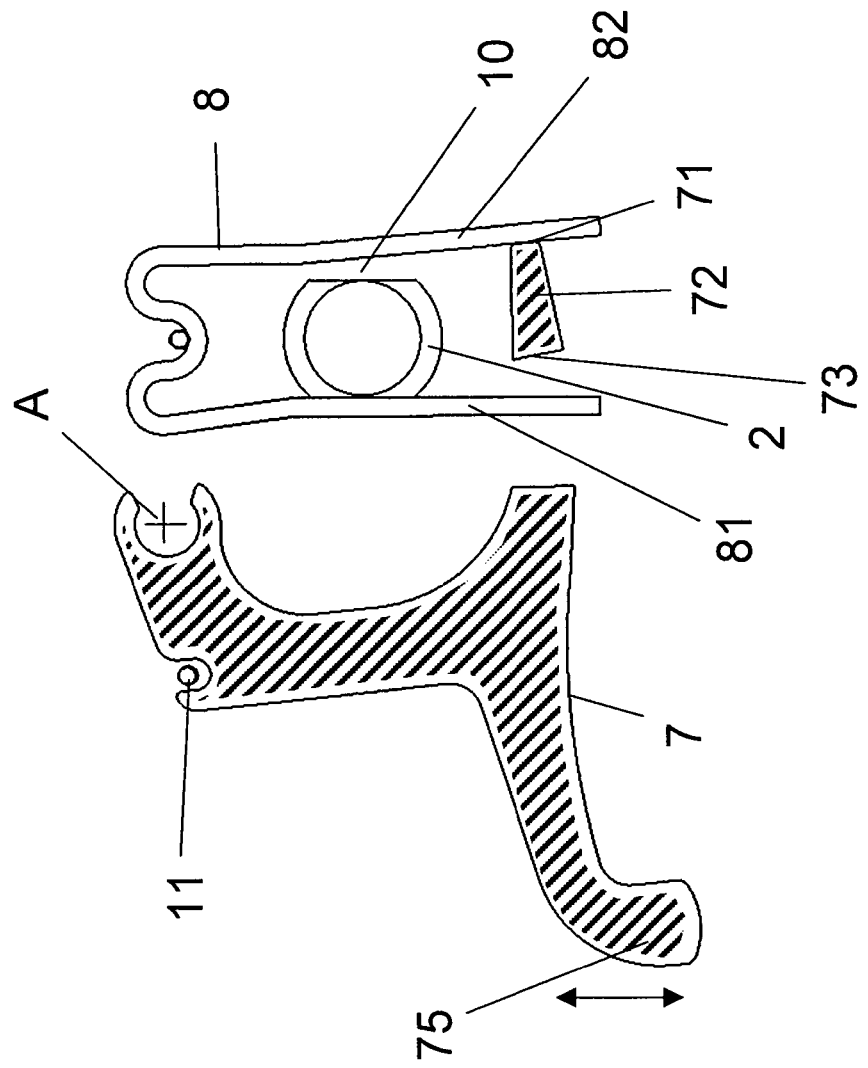
FIG. 10 shows a detailed cross-sectional top view of a preferred embodiment of the bracket system of a vehicle seat's headrest actuated in the second direction.

The actuation mechanism is straightforward from top views in FIGS. 9 and 10. FIG. 9 shows the actuation arm 7 actuated in the first direction, i.e. when the button 6 is pressed. The actuation lever has the form of an h-shaped bell crank that is pivotably connected to the carrier bar guiding 5 such that it can pivot about the vertical axis A. The inner portion 76 of the actuation arm 7 in contact with the button 6 has essentially traveled in a forward direction while the outer portion 72 of the actuation arm 7 in contact with the spring element 8 has essentially traveled in an inward (shown as left in FIG. 9) direction. This inward movement forces the first portion 81 of the spring element 8 that is in contact with the outer portion 73 of the opening 74 in the actuation arm 7 to bend inwards. In this actuated situation the first portion 81 of the spring element 8 is moved away from the carrier bar 2 and released from a notch of a first kind 9. The head rest can therefore be lowered into any desired position as long as the actuation arm 7 is actuated in the first direction as shown in FIG. 9. The preloaded spring 11 forces the actuation arm 7 and the button 6 back into normal position after the actuation arm 7 has been actuated in the first direction, i.e. when the button 6 has been pressed.

FIG. 10 shows the actuation arm 7 actuated in the second direction, i.e. when the button 6 and/or the mounting frame 6a of the button 6 is dismounted. The preloaded spring 11 forces the actuation arm 7 to actuate in the second direction. Alternatively or in addition, manual tearing of the actuation lever 7 can perform the actuation in the second direction. The opening 74 in the actuation lever 7 allows the portion 72 of the actuation lever 7 that is in contact with the spring element 8 to move in an outward direction without biasing the first portion 81 of the spring element 8 outwards against the carrier bar 2. The outer surface 71 of the outer portion 72 of the actuation arm 7 that is in contact with the second portion 82 of the spring element 8 forces the second portion 82 of the spring element 8 to bend outwards. In this actuated situation the second portion 82 of the spring element 8 is moved away from the carrier bar 2 and released from the notch of a second kind 10. The head rest 4 can therefore be dismounted by pulling it out in an upward direction as long as the actuation arm 7 is actuated in the second direction, i.e. when the button 6 and/or the mounting frame 6a of the button 6 is dismounted, as shown in FIG. 10.

It should be understood that the invention is not limited to the embodiment depicted in the FIGS. 1 to 10. As will be obvious to a man skilled in the art, the mechanical means for blocking an upward/downward movement of the head rest can be arranged simultaneously at both carrier bars or at the other carrier bar only. The notches of the first kind are not necessarily placed on the inner side of a carrier bar or the notch of the second kind does not need to be placed on the outer side of a carrier bar. Instead of a few notches of a first kind that are placed a relatively long way apart from each other a ridge of many notches of a first kind is as well employable allowing for an essentially continuous adjustment of the head rest's height.

The invention claimed is:

1. A system for raising and lowering an adjustable headrest of a vehicle seat, comprising:
   at least one carrier bar for carrying the adjustable headrest, the carrier bar having at least one first notch arranged on a first line and at least one second notch arranged on a second line, the first and second lines being parallel to a longitudinal axis of the carrier bar;
   a carrier bar guiding element operably connected to the at least one carrier bar to permit sliding movement of the at least one carrier bar relative to the carrier bar guiding element;
   a spring element attached to the carrier bar guiding element, the spring element including at least first and second portions, the first portion being biased toward the first line and configured to engage the at least one first notch to lock a longitudinal movement of the carrier bar in a first direction, and the second portion being biased toward the second line and configured to engage the at least one second notch to lock the longitudinal movement of the carrier bar in a second direction; and an actuation arm pivotally connected to the carrier bar guiding element and configured to contact at least one of the first portion and the second portion of the spring element so as to permit the longitudinal movement of the carrier bar in either the first direction or the second direction.

2. The system of claim 1, wherein upon actuation of the actuation arm in the first direction, the first portion of the spring element moves away from the carrier bar so as not to engage the at least one first notch, and thereby allow the longitudinal movement of the carrier bar in the first direction.

3. The system of claim 1, wherein upon actuation of the actuation arm in the second direction, the second portion of the spring element moves away from the carrier bar so as not to engage the at least one second notch in order to allow the longitudinal movement of the carrier bar in the second direction.

4. The system of claim 1, further comprising a button mounted on the carrier bar guiding element such that the button is depressed to enable movement of the actuation arm in the first direction, and the button blocks movement of the actuation arm in the second direction.

5. The system of claim 4, wherein the button is configured to be dismounted from the carrier bar guiding element.

6. The system of claim 5, wherein the button is operably connected to a mounting frame.

7. The system of claim 5, wherein the actuation arm is actuated in the second direction by manual operation of the actuation arm if the button is dismounted.

8. The system of claim 5, wherein the headrest is configured to be removed in an upward direction if the button is dismounted and the actuation arm is actuated in the second direction.

9. The system of claim 4, wherein the button is mounted on a mounting frame, the mounting frame blocking the actuation arm from being actuated in the second direction.

10. The system of claim 1, wherein the at least one first notch has an inclined face pointing downwardly such that the first portion of the spring element can slide against the inclined face to lock in place and prevent further lowering of the headrest.

11. The system of claim 1, wherein the at least one second notch has an inclined face pointing upwardly such that the second portion of the spring element can slide against the inclined face to lock in place and prevent further raising of the headrest.

12. The system of claim 1, wherein the at least one carrier bar supports the headrest.

13. The system of claim 12, wherein the at least one carrier bar comprises first and second carrier bars connected inside the headrest.

14. The system of claim 1, wherein the button protrudes from upholstery of a backrest of the vehicle seat.

15. The adjustable headrest of claim 1, wherein the at least one carrier bar is fixed to the headrest of the vehicle seat.

16. An adjustable headrest for a vehicle seat, comprising:
at least one carrier bar for carrying the adjustable headrest, the carrier bar having at least one first notch arranged on a first line and at least one second notch arranged on a second line, the first and second lines being parallel to a longitudinal axis of the carrier bar;

a carrier bar guiding element operably connected to the at least one carrier bar to permit sliding movement of the at least one carrier bar relative to the carrier bar guiding element;

a spring element attached to the carrier bar guiding element, the spring element including at least first and second portions, the first portion being biased toward the first line and configured to engage the at least one first notch to lock a longitudinal movement of the carrier bar in a first direction, and the second portion being biased toward the second line and configured to engage the at least one second notch to lock the longitudinal movement of the carrier bar in a second direction; and an actuation arm pivotally connected to the carrier bar guiding element and configured to contact at least one of the first portion and the second portion of the spring element so as to permit the longitudinal movement of the carrier bar in either the first direction or the second direction, wherein upon actuation of the actuation arm in the first direction, the first portion of the spring element moves away from the carrier bar so as not to engage the at least one first notch, and thereby allow the longitudinal movement of the carrier bar in the first direction, and upon actuation of the actuation arm in the second direction, the second portion of the spring element moves away from the carrier bar so as not to engage the at least one second notch in order to allow the longitudinal movement of the carrier bar in the second direction.

17. The adjustable headrest of claim 16, further comprising a button mounted on the carrier bar guiding element such that the button is depressed to enable movement of the actuation arm in the first direction, and the button blocks movement of the actuation arm in the second direction.

18. The adjustable headrest of claim 16, wherein the at least one first notch has an inclined face pointing downwardly such that the first portion of the spring element can slide against the inclined face to lock in place and prevent further lowering of the headrest.

19. The adjustable headrest of claim 16, wherein the at least one second notch has an inclined face pointing upwardly such that the second portion of the spring element can slide against the inclined face to lock in place and prevent further raising of the headrest.

20. The adjustable headrest of claim 16, wherein the at least one carrier bar supports the headrest.

* * * * *